United States Patent
Casier

(10) Patent No.: US 7,401,625 B2
(45) Date of Patent: Jul. 22, 2008

(54) SYSTEM FOR SUPPLYING LIQUEFIED GAS TO A COMBUSTION ENGINE WITH A MINIMUM LIQUEFIED-GAS LEVEL DETECTOR

(75) Inventor: Michaël Casier, Ettelbrück (LU)

(73) Assignee: Luxembourg Patent Company, S.A. (LU)

( * ) Notice: Subject to any disclaimer, the term of this patent is extended or adjusted under 35 U.S.C. 154(b) by 43 days.

(21) Appl. No.: 11/039,124

(22) Filed: Jan. 18, 2005

(65) Prior Publication Data

US 2005/0166972 A1    Aug. 4, 2005

(30) Foreign Application Priority Data

Feb. 2, 2004    (EP)    .................... 04100362

(51) Int. Cl.
*F16K 37/00*    (2006.01)
(52) U.S. Cl. ............................ 137/558; 62/49.2; 73/295
(58) Field of Classification Search ................ 137/552, 137/557, 558; 62/49.2, 49.1; 73/61.44, 295, 73/304 C, 61, 44, 32 R–32 A
See application file for complete search history.

(56) References Cited

U.S. PATENT DOCUMENTS

| | | | | |
|---|---|---|---|---|
| 3,792,456 A | * | 2/1974 | Hill | 340/622 |
| 4,176,553 A | * | 12/1979 | Wood | 73/304 C |
| 4,638,288 A | * | 1/1987 | Remec | 340/622 |
| 5,191,869 A | * | 3/1993 | Kamioka et al. | 123/494 |
| 5,201,298 A | * | 4/1993 | Shearn | 123/514 |
| 5,379,637 A | * | 1/1995 | Abowd et al. | 73/290 R |
| 5,701,932 A | * | 12/1997 | Bourscheid et al. | 137/558 |
| 5,842,347 A | * | 12/1998 | Kinder | 62/49.2 |
| 6,016,697 A | * | 1/2000 | McCulloch et al. | 73/304 C |
| 6,295,869 B1 | * | 10/2001 | Delatte | 73/304 C |
| 6,505,470 B1 | * | 1/2003 | Drube et al. | 62/49.2 |
| 6,578,415 B2 | * | 6/2003 | Schimmel et al. | 73/295 |
| 6,675,665 B2 | * | 1/2004 | Blazquez Navarro et al. | 73/865.8 |

FOREIGN PATENT DOCUMENTS

| | | | | |
|---|---|---|---|---|
| DE | 2455252 A | * | 5/1976 | |
| FR | 2812247 A | * | 2/2002 | |
| SE | EP 0088740 A | * | 9/1983 | |

* cited by examiner

*Primary Examiner*—Ramesh Krishnamurthy
*Assistant Examiner*—Cloud K Lee
(74) *Attorney, Agent, or Firm*—Polster, Lieder, Woodruff & Lucchesi, L.C.

(57) ABSTRACT

To detect the volume of gas remaining in a gas bottle or a fixed tank of a system for supplying liquefied gas as fuel for a combustion engine, a positive temperature coefficient (or PTC) probe (16) is placed in the gas feed line (12) between the gas source and the combustion engine. The PTC probe (16) detects the change of phase, from the liquid phase of the liquefied gas to the gaseous phase, in the feed line (12) and delivers an electrical signal to an electronic circuit that triggers a visual or audible signal in response to the detection of the phase change.

8 Claims, 4 Drawing Sheets

SYSTEM FOR SUPPLYING LIQUEFIED GAS TO A COMBUSTION ENGINE WITH A MINIMUM LIQUEFIED-GAS LEVEL DETECTOR

CROSS-REFERENCE TO RELATED APPLICATIONS

This application claims priority under 35 U.S.C. §119 to European Application No. 04100362.5 filed Feb. 2, 2004, and which is incorporated herein by reference.

BACKGROUND OF THE INVENTION

The invention relates to a system for supplying liquefied gas as fuel to a combustion engine, comprising a line for supplying gas to the engine, a liquefied gas source, a minimum liquefied-gas level detector and a means for indicating detection of the minimum level.

Many industrial vehicles use liquefied petroleum gas as fuel. The fuel is stored on the vehicle either in a changeable bottle or in a fixed tank. In the first case, the driver changes the bottle when the fuel is about to run out, while in the second case the driver must drive to a filling station in order to fill the tank.

These two storage modes each have a major drawback:

When the fuel is stored in a bottle, the driver has no information about the fuel level remaining in the bottle. To avoid running out of fuel, the driver has no other alternative but to regularly change the bottle, which generates substantial waste.

When the fuel is stored in a tank, the tank must be filled in a filling station. The filling is carried out on the basis of the differential pressure principle: the pressure of the gas contained in the station's tank "pushes" the liquid phase of the fuel into the vehicle's tank where the pressure is lower. If the pressure of the gas remaining in the tank is above the pressure of the gas in the filling station, filling is impossible. This may occur when the vehicle is running in a high temperature environment (for example a tank exposed to sunshine).

To remedy this problem there exists in the prior art an end-of-fuel-supply detection system that detects the drop in gas pressure. This system is placed in the fuel supply line downstream of the fuel source and upstream of the pressure regulator. When the fuel is about to run out, the pressure of the fuel source drops and a pressure-activated switch turns on a warning light on the dashboard. This system is not reliable as the pressure is directly proportional to temperature—therefore the time remaining before running out of fuel is random and may vary from a few minutes to a few seconds. In most cases, the warning light is turned on at the moment when the engine stalls for lack of sufficient fuel. Since the system is not reliable, the driver ignores the information displayed on the dashboard.

Other manufacturers place a second bottle on the vehicle. This method is not very practical since the vehicle's engine stops when the bottle is empty. If this occurs during a maneuver with a heavy load, the vehicle stops suddenly, and this may be hazardous. In addition, it turns out that some drivers do not automatically replace the empty bottle, the breakdown then occurring when the second bottle is empty.

BRIEF SUMMARY OF THE INVENTION

The object of the invention is to provide a system for supplying liquefied gas as fuel to a combustion engine with a minimum level detector that is reliable and does not have the abovementioned disadvantages of the prior solutions.

According to the invention, the liquefied gas supply system of the aforementioned type is characterized in that the detector is a means arranged in the supply line for detecting the occurrence of the change from the liquid phase of the liquefied gas to the gaseous phase in the supply line.

The detector is placed downstream of the fuel source and upstream of the vaporizer/pressure regulator in which the gas is vaporized by hot water and the pressure of the gas is reduced before being supplied to the motor. The detector that detects the liquid or gaseous phase of the fuel is immersed in the stream of fuel, preferably directly at the outlet of the tank (or of the bottle). The detector is preferably a component of the PTC (positive temperature coefficient) type, the electrical resistance of which element increases proportionally with the temperature.

According to a preferred embodiment, this component is connected to an electronic circuit driven by a microprocessor. The latter continuously controls the intensity of the current flowing through the electrical resistance element of the PTC component.

The current flowing through the PTC component causes the latter to heat up. As long as the element is swept by a flow of liquid fuel, the heat is dissipated immediately and the temperature remains relatively low. When the flow becomes a gas flow, the heat is no longer absorbed by the flow and the temperature of the component increases, which causes a variation in its electrical resistance. This variation is immediately detected by the microprocessor, which causes the warning light on the vehicle's dashboard to be turned on or an audible signal to be generated. As long as the tank (or bottle) contains a sufficient volume of fuel in the liquid phase, the warning light on the dashboard remains off or the audible signal is not triggered.

In the case of operation with fuel in a bottle, the driver will have to replace it within the travel time permitted by the amount of fuel remaining in the bottle.

In the case of storage in a fixed tank, the driver will also be warned when the minimum liquid fuel level is reached. In addition, the system may include in this case a means of detecting the pressure in the tank, and the electrical circuit may include a means of generating a visual or audible signal at the dashboard of the vehicle when the pressure in the tank has decreased down to a value allowing the tank to be filled. This avoids the driver having to drive to a filling station with a tank under high pressure, since filling is possible only if the pressure in the tank is below the filling pressure generated by the station's pump, as mentioned above.

The minimum fuel level detector according to the invention has the following advantages:

1. it is independent of the ambient temperature;
2. there is sufficient time to complete the current maneuver and reach a filling centre for filling the tank or for replacing the bottle;
3. it is possible to use the bottle right to the last drop of fuel (a major financial saving);
4. in the case of a fixed tank, the driver returns to the filling centre only when filling is possible (therefore saving time because unnecessary round trips are avoided).

DETAILED DESCRIPTION OF THE INVENTION

The operating principle will now be explained in greater detail with reference to FIGS. 1 and 2.

The fuel supply system with a minimum fuel level detector includes a fuel source 10, for example a liquefied gas tank or bottle. A supply line 12 extends from the fuel source 10 to the engine (not shown). A dip tube 14 forming part of the supply line 12 is fastened to the service tap (not shown) of the bottle or tank, and it allows the fuel to be led from the bottle or tank to a pressure regulator (not shown). A detection device 16 provided with a PTC component or probe is located in the supply line, preferably at the outlet of the bottle or fixed tank upstream of the pressure regulator (not shown).

Figure 1:
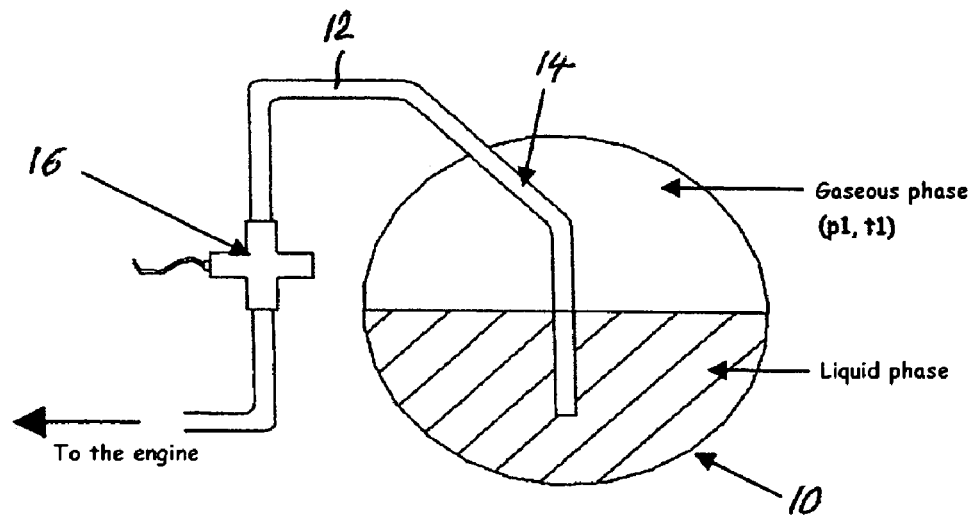
FIGS. 1 and 2 show the operating principle of the system according to the present invention.

In FIG. 1, the lower end of the dip tube 14 is in the liquefied gas. The gaseous phase is at the pressure p1 and at the temperature t1 dependent on the ambient temperature. The pressure pushes the liquid into the dip tube 14 and fills the pipe 12 as far as the pressure regulator (not shown). The PTC probe (FIG. 3) of the detection device 16 for detecting the change of phase (liquid to gas) of the fuel inserted in the supply line 12 is swept by the fuel in liquid form.

Figure 2:
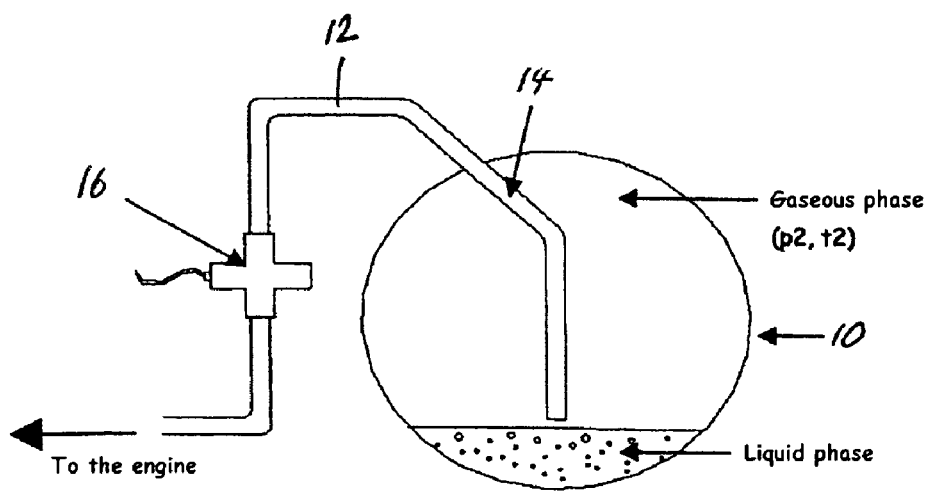

When the liquid level has reached a level below the end of the dip tube 14, as shown in FIG. 2, the supply line 12 becomes empty of the liquid fuel phase and the gaseous flow that bathes the PTC probe will no longer be sufficient to maintain the temperature of the probe below the detection threshold. The microprocessor of the electronic circuit (FIG. 4) detects this rise in temperature and generates a light or audible signal in order to warn the driver that the vehicle is running on the gaseous phase of the fuel.

If the fuel is stored in a bottle, the driver will then drive to the place of storage in order to replace it.

If the fuel is stored in a fixed tank, the driver must continue to use the vehicle. The gas pressure in the tank will progressively drop and the driver will be warned by a second signal emitted by a pressure detection means (FIG. 5) when the pressure in the tank has reached the threshold allowing it to be filled.

When the liquid level is below the end of the dip tube 14, the little liquid that remains will evaporate. This evaporation will lower the temperature within the tank, which will speed up the drop in pressure. As mentioned above, the sensor or the pressure detection means will trigger the second signal, inviting the driver to drive to a filling station when the pressure is low enough to allow filling.

Consequently, whatever the source or the method of storing the fuel (bottle or fixed tank), the system according to the invention will warn the driver that he is close to running out of fuel by detecting the change of phase (liquid to gas) of the fuel in the supply line. The fuel has a low combustibility when it is in gaseous form, while the operating time left will be 5 to 10 minutes depending on the pressure within the bottle (or tank).

Figure 3:
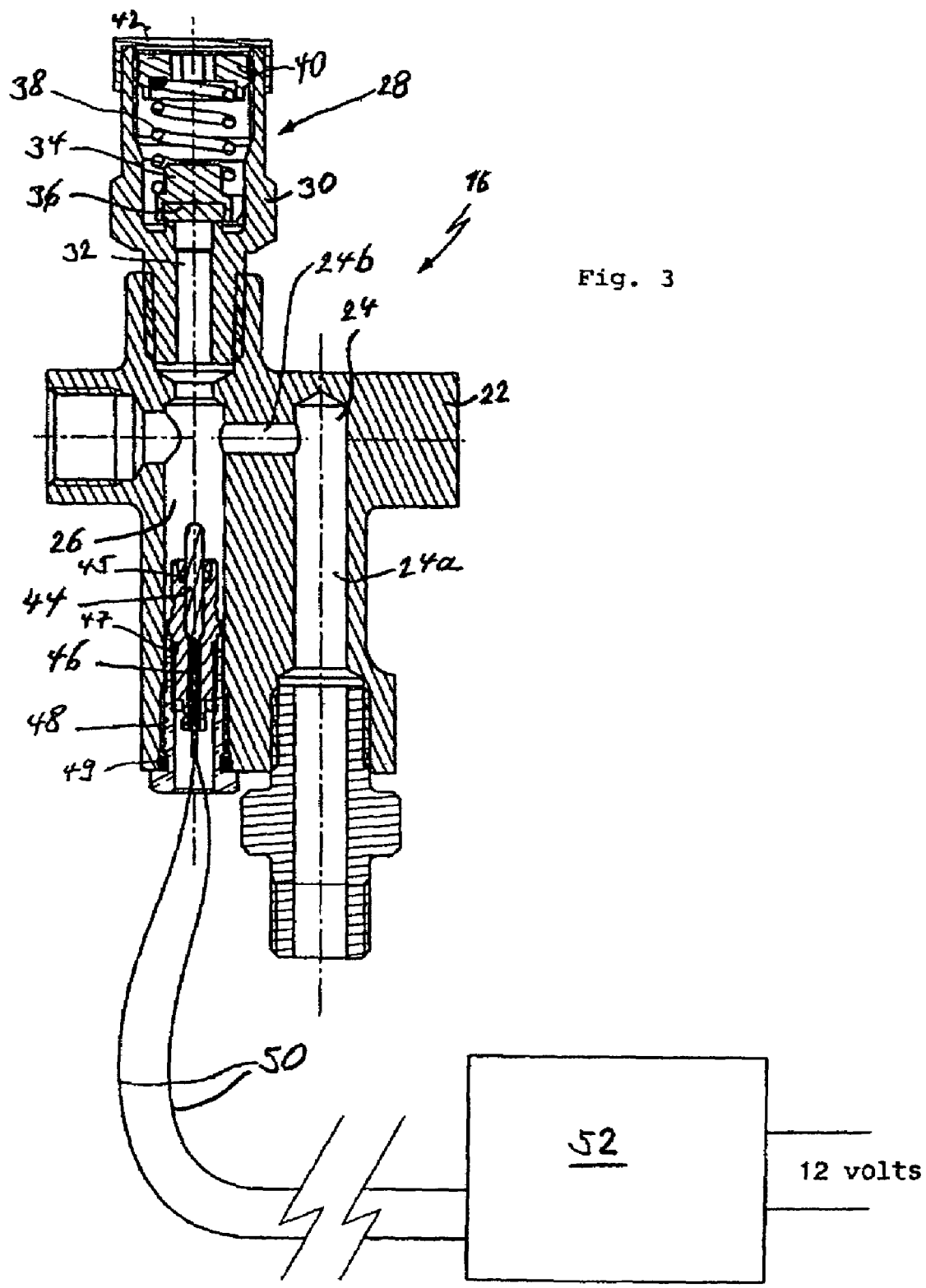
FIG. 3 shows the detection device with the PTC component in vertical section.

FIG. 3 shows an example of the detection device 16 inserted into the supply line 12. This detection device 16 has a body 22 provided with a fuel passage 24, which passes through it. The fuel passage 24 is connected on one side to that upstream part of the supply line 12 which is connected to the fuel source 10 and is connected on the other side to that downstream part of the fuel line 12 which goes towards the pressure regulator and the engine (these not being shown). The fuel passage 24 has a vertical part 24a and a horizontal part 24b.

A pressure-reducing safety valve 28 having a body 30 provided with a central passage 32 communicates with the horizontal part 24b of the fuel passage 24. The safety valve 28 is provided with a seat disc 34 carrying a sealing washer 36. A helical spring 38 pushes the seat disc 34 downwardly in order to engage the sealing washer 36 with a fixed seat of the body of the valve 28. The other end of the spring 38 presses on an adjustable disc 40 screwed into a threaded part of the body of the valve 28. A cap 42 closes off the upper end of the safety valve 28. When the pressure in the passage 24 passing through the device 22 exceeds a predetermined value, the sealing washer 36 is lifted off its seat under the effect of the pressure, with a view to reducing the overpressure.

The PTC probe or sensor 44 is located in a second vertical passage 28 that communicates with the horizontal passage 24b. This probe 44 is housed in a central bore of a support body 46 which is screwed into a tubular retaining screw 48 which is in turn screwed into a threaded part at the lower end of the second vertical passage 28 of the body 22 of the device 16. Seals 45, 47 and 49 are provided between: (1) the probe 44 and its support 46; (2) the support 46 and the retaining screw 48; and (3) the screw 48 and the body 22. The probe 44 has an enlarged top part that extends, at its upper end, upwards beyond the support 46 so as to be swept by the fuel flowing from the fuel source towards the engine. At its lower end, the PTC probe 44 is provided with a thinned rod connected by electrical conductors 50 to the electronic circuit 52. The electronic circuit 52 controls the intensity of the current flowing through the PTC probe 44 and detects a variation in the electrical resistance of the PTC element caused by an increase in its temperature when it is no longer swept by a flow of liquid fuel. Detection of the change in electrical resistance of the PTC probe 44 immediately causes a visual signal 54 or an audible signal 54 to be issued at the vehicle's dashboard.

Figure 4:
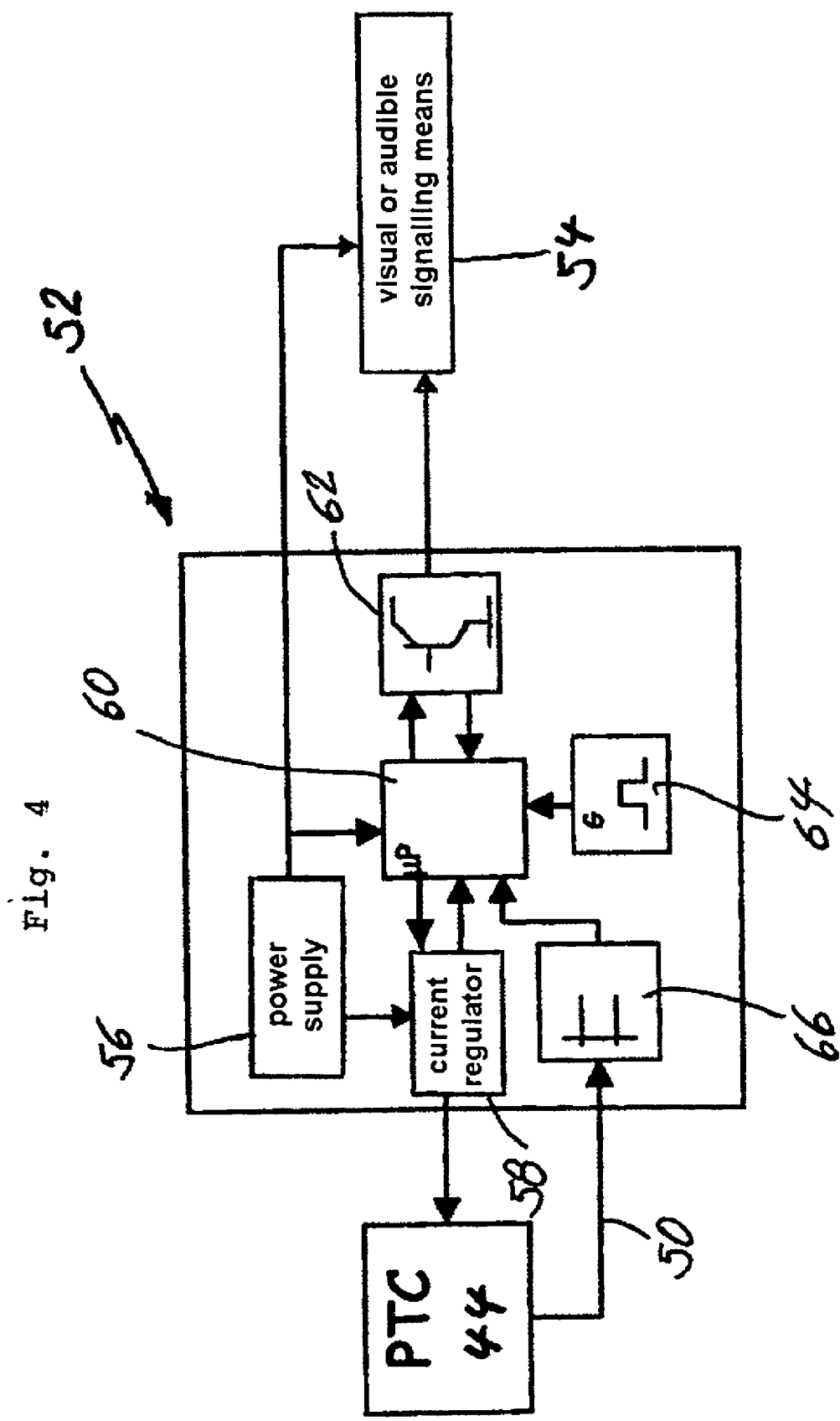
FIG. 4 is a diagram of the electronic circuit according to a first embodiment.

FIG. 4 shows an example of the electronic circuit 52 according to a first embodiment. The electronic circuit 52 is supplied via the power supply 56 for the modules of the circuit 52, such as the current regulator 58, the microprocessor 60 and the visual or audible signal means. The microprocessor 60 is operated at a frequency delivered by a clock circuit 64 in the usual manner known in the prior art. The power supply 56 communicates with the microprocessor 60 for the purpose of ensuring that a constant electrical current flows through the PTC element 44, as described above. The electrical voltage caused by the flow of this current through the PTC element 44 is applied to a detector circuit 66 and picked up by the latter. The detector circuit 66 compares the voltage level at the PTC element 44 with a reference value, and transmits the result of this operation in digital form to the microprocessor 60. Depending on the result, the microprocessor 60 causes an output element 62 to trigger a visual or audible signal by means of a signaling means 54.

The operating mode of this electronic circuit 52 is as follows. The current regulator 58 delivers a constant current to the PTC element 44, which generates an electrical voltage across the terminals of the latter that is proportional to the electronic resistance of the PTC element 44. Assuming that the liquid gas level is high enough, that is to say the PTC element 44 is swept by the liquid, preventing the PTC element 44 from heating up, the resistance of this element is relatively low. When the gas level in the bottle or tank drops, the PTC element 44 is no longer cooled by the liquid gas. Thus, the constant current delivered by the current regulator 58 to the PTC element causes the latter to heat up, and this results in a change in its electrical resistance proportional to its temperature. This change in resistance can be measured by the electrical voltage detected by the detector circuit 66. When the temperature reaches a predetermined level, the detector circuit 66 indicates this to the microprocessor 60, which triggers the visual or audible signal.

Figure 5:
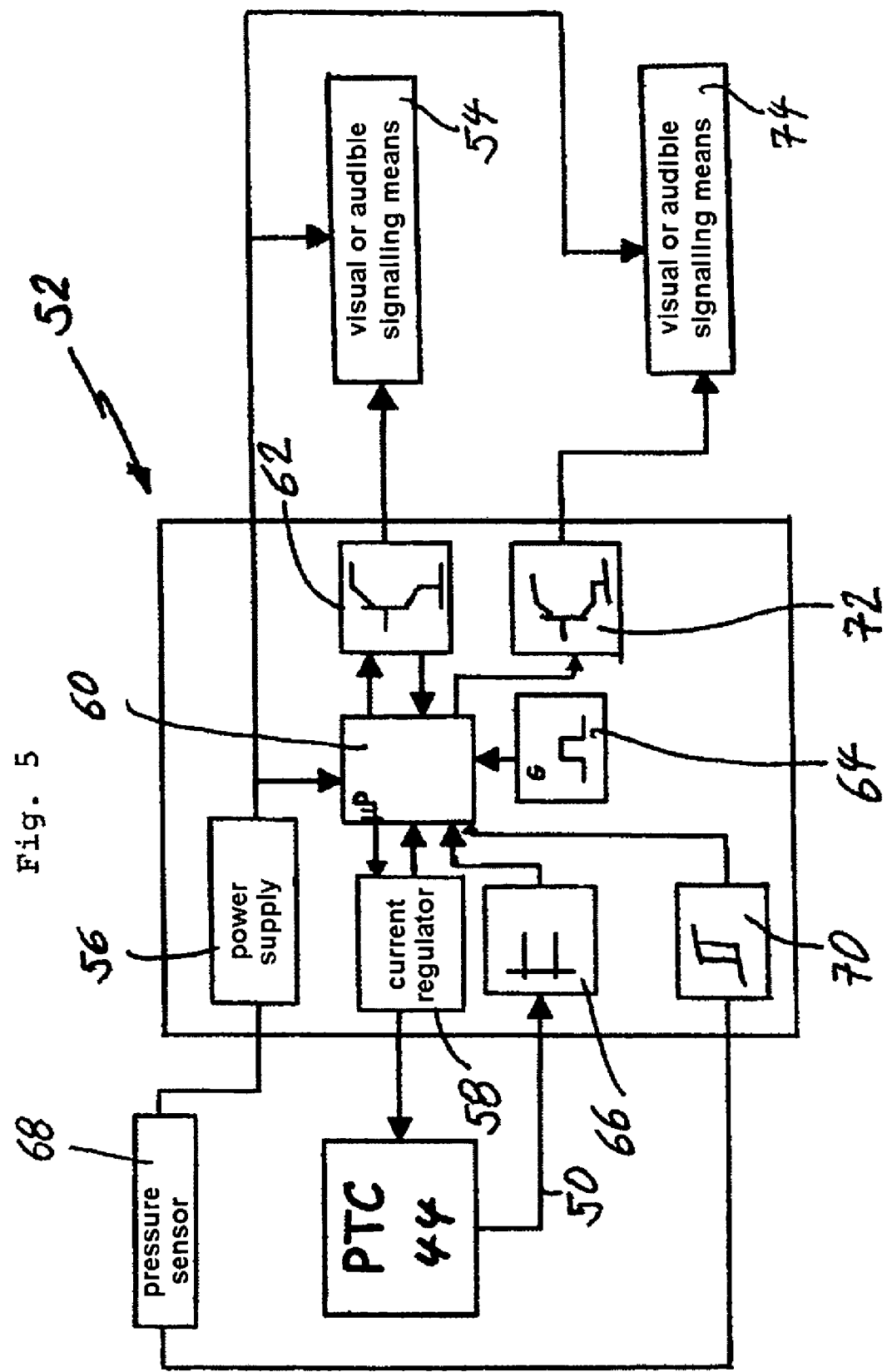
FIG. 5 is a diagram of the electronic circuit according to a second embodiment.

In FIG. 5, a pressure sensor 68 has been added to the electronic circuit 52 according to a preferred embodiment. This sensor 68 is also supplied by the electrical current source 56. The pressure detected, in the form of an electrical voltage, is transmitted to a second detector circuit 70. The detector circuit 70 compares the pressure level at the sensor 68 with a reference value and sends the result of this operation in digital form to the microprocessor 60. Depending on the result, the microprocessor 60 causes a second output element 72 to trigger a second visual or audible signal by means of a second signaling means 74.

The operating mode of this modified electronic circuit 52 is as follows. The electrical current source 56 delivers a constant voltage to the pressure sensor 68, which generates an electrical voltage across the terminals of the latter that is proportional to the pressure in the tank. Assuming that the pressure in the tank is relatively high, the voltage across the terminals of the sensor is also relatively high. When the pressure in the tank drops, the voltage across the terminals of the sensor 68 also drops. Thus, this change in pressure can be measured by the electrical voltage detected by the detector circuit 70. When the pressure reaches a predetermined level, the detector circuit 70 indicates this to the microprocessor 60, which triggers the second visual or audible signal.

It is clearly understood that although the examples of the embodiments described above refer to a circuit based on a microprocessor, equivalent functions could also be produced by analogue circuits.

In view of the above, it will be seen that the several objects and advantages of the present invention have been achieved and other advantageous results have been obtained.

The invention claimed is:

1. A fuel supply system for supplying liquefied gas as fuel to a combustion engine, the system comprising:
   a container of liquefied gas, said liquefied gas being present in said container in a vapor phase and a liquid phase;
   a fuel supply line for supplying the liquefied gas from the container to the engine; the supply line having an inlet end at a predetermined level in the container; whereby liquefied gas in the liquid phase will be supplied through the supply line to operate the engine when the level of the liquid phase of the liquefied gas is above the inlet end of the supply line and wherein liquefied gas in the vapor phase will be supplied through the supply line to the engine to operate the engine for a remaining limited time period when the liquid phase of the liquefied gas level in the container falls below the inlet end of the supply line; and
   a phase change detector positioned in the fuel supply line externally of said liquefied gas container; said phase change detector detecting the occurrence of a change from the liquid phase of the liquefied gas to the vapor phase of the liquefied gas in the supply line when the liquid phase in the container falls below the supply line inlet,
   a warning signal activated by said system in response to the detection of said change from the liquid phase to the vapor phase of the liquefied gas in said supply line, said warning signal being indicative of a low level of liquefied gas in the liquid phase in said container to warn an operator that the engine will shortly run out of fuel.

2. The system of claim 1 wherein the phase change detector comprises a positive temperature coefficient (PTC) probe placed in the supply line; said PTC probe being connected into an electrical circuit that sends an electrical current to the probe; the electrical circuit including means for detecting a variation in the electrical resistance of the PTC probe resulting from an increase in the temperature of the PTC probe after the change in the liquefied gas from the liquid phase to the vapor phase in the supply line.

3. The system of claim 2 wherein the electrical circuit is provided with means for producing a visual or audible signal in response to detection of the variation in the electrical resistance of the probe.

4. The system of claim 2 wherein the supply line includes a dip tube extending into the liquefied gas container to a height in the container corresponding to the said predetermined level, and the PTC probe is placed in the supply line outside the liquefied gas container.

5. The system of claim 1 wherein the liquefied gas container is a liquefied gas bottle which is to be replaced with a new gas bottle after the change in phase of the liquefied gas in the supply line has been detected.

6. The system of claim 1 wherein the liquefied gas source is a fixed tank; the system further including means for detecting the gas pressure in the tank and a means for producing a visual or audible signal when the pressure in the tank has dropped to a value allowing the tank to be filled.

7. The system of claim 1 wherein the supply line including a dip tube extending into the liquid gas source up to a height corresponding to the said minimum level.

8. The system of claim 1 wherein said supply line comprises a dip tube; a bottom of said dip tube defining said supply line inlet; said dip tube extending into the container a distance sufficient such that the bottom of said dip tube is at a height in said liquefied gas container corresponding to the said predetermined level.

* * * * *